United States Patent
Wang et al.

(10) Patent No.: US 8,861,455 B2
(45) Date of Patent: Oct. 14, 2014

(54) METHOD AND SYSTEM FOR SIGNALING CONFIGURATION OF PHYSICAL UPLINK SHARED CHANNEL

(75) Inventors: Yuxin Wang, Shenzhen (CN); Peng Hao, Shenzhen (CN); Bo Dai, Shenzhen (CN); Chunli Liang, Shenzhen (CN); Bin Yu, Shenzhen (CN); Peng Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 220 days.

(21) Appl. No.: 13/258,968

(22) PCT Filed: Jun. 30, 2010

(86) PCT No.: PCT/CN2010/074768
§ 371 (c)(1),
(2), (4) Date: Jul. 3, 2012

(87) PCT Pub. No.: WO2011/082574
PCT Pub. Date: Jul. 14, 2011

(65) Prior Publication Data
US 2012/0300711 A1 Nov. 29, 2012

(30) Foreign Application Priority Data
Jan. 8, 2010 (CN) .......................... 2010 1 0003862

(51) Int. Cl.
*H04W 4/00* (2009.01)
*H04L 5/00* (2006.01)
*H04W 72/12* (2009.01)
*H04L 25/03* (2006.01)
*H04J 13/00* (2011.01)
*H04J 11/00* (2006.01)

(52) U.S. Cl.
CPC ............ *H04L 5/0016* (2013.01); *H04L 5/0023* (2013.01); *H04W 72/12* (2013.01); *H04L 5/0091* (2013.01); *H04L 25/03898* (2013.01); *H04J 13/004* (2013.01); *H04J 11/0033* (2013.01); *H04L 25/03949* (2013.01); *H04J 13/0074* (2013.01); *H04L 5/0051* (2013.01)
USPC ............................ 370/329; 370/260; 370/400

(58) Field of Classification Search
CPC .............. H04W 72/042; H04W 72/12; H04W 72/0413
See application file for complete search history.

(56) References Cited

U.S. PATENT DOCUMENTS

2008/0212464 A1  9/2008  Kim et al.
2010/0173625 A1*  7/2010  Noh et al. .................. 455/422.1
2012/0300711 A1* 11/2012  Wang et al. ................... 370/329

FOREIGN PATENT DOCUMENTS

CN    101252783 A    8/2008
CN    101404815 A    4/2009

(Continued)

OTHER PUBLICATIONS

International Search Report in international application No. PCT/CN2010/074768, mailed on Oct. 28, 2010.
English Translation of the Written Opinion of the International Search Authority in international application No. PCT/CN2010/074768, mailed on Oct. 28, 2010.

(Continued)

*Primary Examiner* — David Oveissi
(74) *Attorney, Agent, or Firm* — Oppedahl Patent Law Firm LLC (57) ABSTRACT

The disclosure provides a method and system for signaling configuration of a Physical Uplink Shared Channel (PUSCH), the system comprises a base station and a target User Equipment (UE). The method comprises: a base station sends Downlink Control Information (DCI) to the target user equipment through a Physical Downlink Control Channel (PUCCH); and the downlink control information includes orthogonal cover code information and/or cyclic shift information for scheduling the physical uplink shared channel in the multi-antenna port transmission and/or single antenna port transmission. It is very adaptable and flexible to use the combination of multiple kinds of information to indicate the orthogonal cover code information in the downlink control information. The UE can obtain the orthogonal cover code information accurately, and the reliability of services can be improved.

6 Claims, 3 Drawing Sheets

(56) References Cited

FOREIGN PATENT DOCUMENTS

| | | | |
|---|---|---|---|
| CN | 101465720 A | 6/2009 | |
| EP | 2056515 A1 | 5/2009 | |
| EP | 2 056 515 A1 * | 10/2009 | ............... H04L 5/02 |
| RU | 2232525 C2 | 7/2004 | |
| WO | 2009020983 A1 | 2/2009 | |
| WO | 2009022823 A2 | 2/2009 | |
| WO | 2009056464 A1 | 5/2009 | |
| WO | 2009156441 A2 | 12/2009 | |

OTHER PUBLICATIONS

UL DM RS Multiplexing for SU-MIMO Nov. 9, 2009.
Uplink DM RS enhancement for LTE-Advanced Nov. 9, 2009.
Texas Instruments, "MCS and HARQ Bundling for Uplink SU-MIMO," 3GPP TSG RAN WG1 56bis, R1-091299, Mar. 23, 2009. (9 pages—see entire document).
Panasonic, "Views on UL DM-RS," 3GPP TSG-RAN WG1 Meeting #59, R1-094508, Nov. 9, 2009. (4 pages—see entire document).
Samsung, "Clarification on Mapping of Cyclic Shift Field in DCI format 0", 3GPP TSG-RAN Working Group 1 #53bis, R1-082302, Jun. 30, 2008. (3 pages—see entire document).

* cited by examiner

METHOD AND SYSTEM FOR SIGNALING CONFIGURATION OF PHYSICAL UPLINK SHARED CHANNEL

TECHNICAL FIELD

The disclosure relates to the field of mobile communications, particularly to a method and system for signaling configuration of a physical uplink shared channel.

BACKGROUND

In the 3rd Generation Partnership Project Long Term Evolution (3GPP LTE) system, transmission on a Physical Uplink Shared Channel (PUSCH) of a User Equipment (UE) is controlled by means of centralized scheduling of the base station.

Uplink scheduling information of the PUSCH is sent to a target UE from the base station through a Physical Downlink Control Channel (PDCCH). The uplink scheduling information comprises control information, such as resource allocation related to the channel, modulation and coding solution, and cyclic shift for a Demodulation Reference Signal (DMRS for short).

The PDCCH is used for bearing uplink and downlink scheduling information as well as uplink power control information. Downlink Control Information (DCI) has the following several formats:

DCI format 0, 1, 1A, 1B, 1C, 1D, 2, 2A, 3, 3A, and so on.

DCI format 0 is used for indicating scheduling of a Physical Uplink Shared Channel (PUSCH for short);

DCI format 1, 1A, 1B, 1C and 1D are used for different transmission modes of a Physical Downlink Shared Channel (PDSCH for short) of a single Transport Block (TB);

DCI format 2 and 2A are used for different transmission modes in space division multiplexing; and DCI format 3 and 3A are used for transmission of power control instructions on a Physical Uplink Control Channel (PUCCH) and the PUSCH.

An LTE-Advanced system (LTE-A system for short) is the next generation evolution system of the LTE system. In technologies related to the LTE, uplink scheduling DCI format 0 does not support uplink multi-antenna transmission, in the scenario of LTE-A uplink multi-antenna transmission, in order to enhance the function of signaling indication, it is required to add a new format which is called as DCI format X into the uplink scheduling DCI, or to extend the length of the signaling based on the existing signaling type of DCI format 0.

In the LTE system, DCI format 0 comprises the following specific information:

Flag for distinguishing the DCI format 0 and the DCI format 1A;
Frequency hopping flag;
Resource block assignment and frequency hopping resource assignment;
Modulation and Coding Scheme (MCS) and Redundancy Version (RV);
New Data Indicator (NDI);
Transmission Power Control (TPC) command for the scheduled PUSCH;
Cyclic shift for the Demodulated Reference Signal (DM RS);
Uplink (UL) index, only existing in a Time Division Duplex (TDD) system, and used when uplink-downlink configuration is 0;
Downlink Assignment Index (DAD, only existing in the TDD system, and used when the uplink-downlink configuration is 1 to 6;
Channel Status Indication (CQI) request.

The DCI format 0 indicates the cyclic shift for the demodulation reference signal of the scheduled PUSCH, as shown in Table 1.

TABLE 1

| Cyclic shift field in DCI format 0 | $n^{(2)}_{DMRS}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

Figure 1:
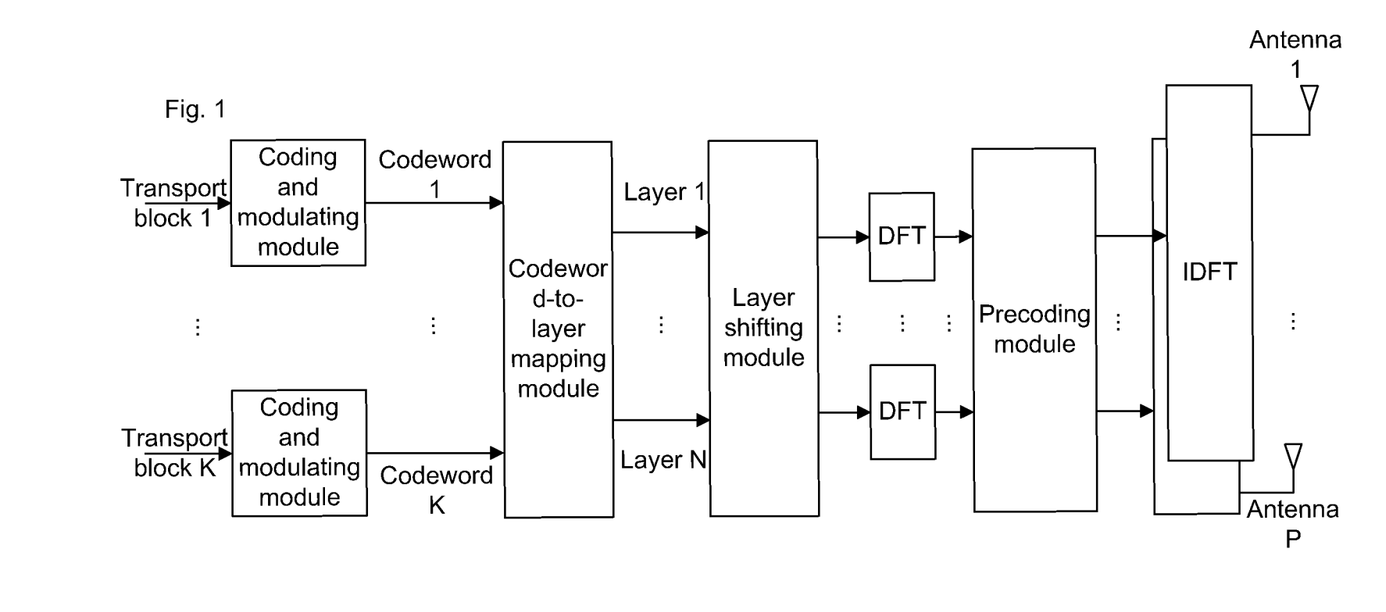
FIG. 1 shows a schematic diagram for processing a signal at a transmitting end employing SU-MIMO in the uplink in the prior art.

In the LTE-A system, a single antenna port transmission or a multi-antenna port transmission can be used for the PUSCH. FIG. 1 shows a schematic diagram for processing a transmitting end baseband signal of a physical uplink shared channel in an existing LTE-A employing multi-antenna port transmission.

In FIG. 1, when the multi-antenna port transmission is performed, the LTE-A system supports one or two codewords (CW) based spatial multiplexing, each codeword corresponds to one Transport Block (TB), or the correspondence relation between the transport block and the codeword can be changed according to the transport block to codeword swap flag. Therefore, the LTE-A system supports transmission mode with a single transport block or double transport blocks.

Figure 2:
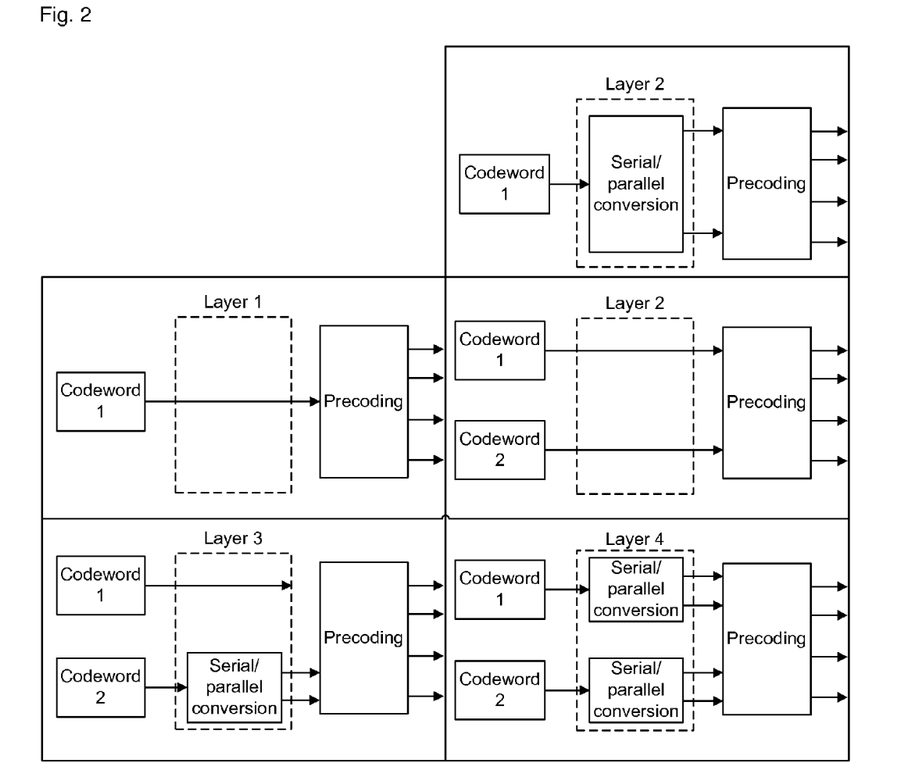
FIG. 2 shows a schematic diagram illustrating an embodiment of mapping a codeword to a layer.

Codewords are further mapped to layers, and each codeword is mapped into data in one or two layers. FIG. 2 shows a schematic diagram illustrating a method of mapping a codeword to a layer. Functions of a codeword-to-layer mapping module are illustrated below simply by taking two codewords and four transmitting antennas as example. When two codewords are mapped to two layers, a codeword 0 is directly mapped to the first layer and a codeword 1 is directly mapped to the second layer; when two codewords are mapped to three layers, the codeword 0 is directly mapped to the first layer, the codeword 1 is mapped to the second layer and the third layer after serial/parallel conversion; when two codewords are mapped to four layers, the codeword 0 is mapped to the first layer and the second layer after serial-parallel conversion, and the codeword 1 is mapped to the third layer and the fourth layer after serial-parallel conversion.

Figure 3:
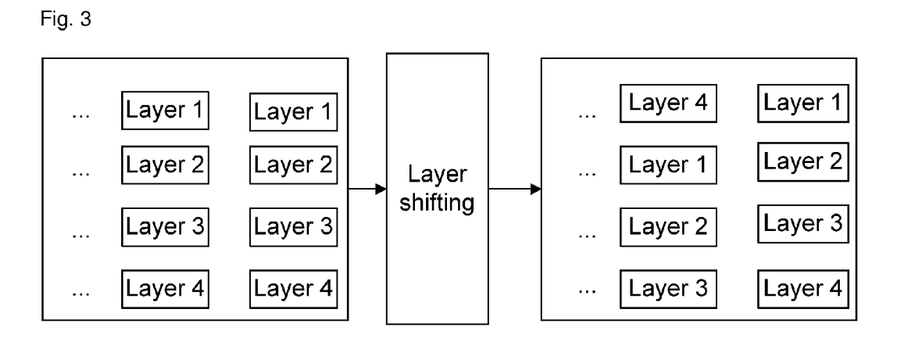
FIG. 3 shows a schematic diagram of an embodiment illustrating the effect before and after layer shifting.

Before precoding, data in each layer can be processed independently or in parallel, or data in multiple spatially-multiplexed layers can be shifted on one modulation symbol or one DFT-S-OFDM symbol or one slot by adopting the Layer Shifting (LS) technology. FIG. 3 shows a schematic diagram illustrating the effect before and after layer shifting. As shown in FIG. 3, a layer shifting module is an optional configuration at the transmitting end, that is, this module can be turned off under some conditions, that is to say, the layer shifting is not enabled.

When two-codeword spatial multiplexing is employed and the layer shifting is not enabled, independent rate control, channel coding and modulation are performed on the two codewords, and the two codewords are allocated with independent Hybrid Automatic Repeat-reQuest (HARQ) process; when two-codeword spatial multiplexing is employed and the layer shifting is used, spatial bundling is performed on the two codewords, the two codewords have the same modulation and coding scheme and are allocated with one hybrid automatic repeat-request process.

The LTE-A system employs a codebook-based linear precoding technology, the precoding technology is a technology in which preprocessing is performed on the signal at the transmitting end by utilizing Channel Status Information (CSI) to improve the performance of the multi-antenna system. One way to obtain the CSI at the transmitting end is to obtain the feedback from the receiving end. In order to reduce the feedback overhead, the general way is to store identical codebooks, namely, precoding matrix sets, at the receiving end and the transmitting end. The receiving end selects a proper precoding matrix from the codebook according to the current channel situation and feeds a Precoding Matrix Index (PMI) in the precoding matrix set back to the transmitting end, while the transmitting end finds out the precoding matrix according to the fed precoding matrix index and performs precoding on sent signals. The mathematical model for data precoding is y=HWs+n, where y is a vector of a received signal, H is a channel coefficient matrix, W is a precoding matrix, s is a signal vector, and n is a noise vector.

Figure 4:
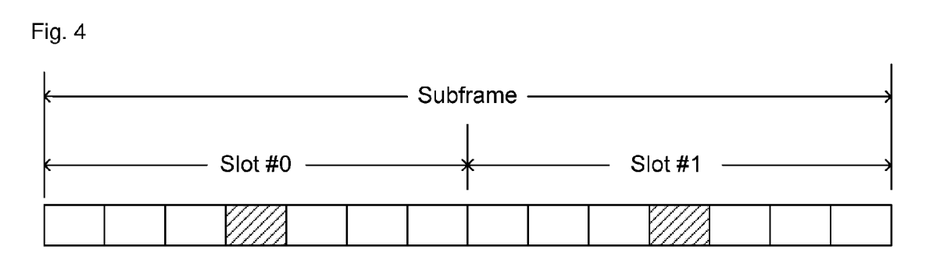
FIG. 4 shows a diagram illustrating structure of pilot symbols within one uplink subframe.

In the LTE-A system, when the physical uplink shared channel employs multi-antenna port transmission, precoding is performed on data in each layer and a Demodulation Reference Signal (DM RS) thereof in the same way. While for the demodulation reference signals of data in different layers, including the demodulation reference signals of data in multiple layers at the same user equipment in a Single User Multi-Input Multi-Output (SU-MIMO) system and the demodulation reference signals of data in multiple layers at multiple user equipments in a Multi-User Multi-Input Multi-Output (MU-MIMO) system, different Cyclic Shifts (CSs) for demodulation reference signals and/or Orthogonal Cover Codes (OCCs) are used for orthogonalization to distinguish data in different spatially-multiplexed layers or to distinguish different users, therefore, cyclic shifts and orthogonal cover codes ($n^{(2)}_{DMRS}$, $n_{occ}$) can be used to represent orthogonal resources. Wherein orthogonal cover codes (OCCs) are [+1, +1] and [+1, −1], acting on the demodulation reference signals in two slots within one subframe. Each subframe of the PUSCH comprises two slots, and each slot consists of six data symbols and one demodulation reference signal, as shown in FIG. 4.

The uplink scheduling information of the PUSCH in the LTE system comprises control information, such as the resource allocation related to the channel, the modulation and coding solution, and the cyclic shift for the Demodulation Reference Signal (DMRS). However, at present, there is no signaling indication information for the OCC. In the LTE-A system, how to reasonably design a signaling to indicate the OCC, or how to use a signaling to indicate both the CS and OCC is a problem to be solved.

SUMMARY

The technical problem to be solved in the disclosure is to provide a method and system for signaling configuration of a physical uplink shared channel, to solve the problem of indication of Orthogonal Cover Code (OCC) information in uplink scheduling information of the physical uplink shared channel in the current LTE system.

In order to solve the above problems, the disclosure provides a method for signaling configuration of a physical uplink shared channel, which comprises:

sending, by a base station, downlink control information to a target user equipment through a physical downlink control channel, wherein the downlink control information comprises orthogonal cover code information for a demodulation reference signal and/or cyclic shift information for a demodulation reference signal, and is used for scheduling the physical uplink shared channel in a multi-antenna port transmission and/or a single antenna port transmission.

The downlink control information may comprise indication information combining a cyclic shift and an orthogonal cover code for the demodulation reference signal.

The indication information combining the cyclic shift and the orthogonal cover code for the demodulation reference signal may be 3-bit or 4-bit in size, and used for using a combination of orthogonal resources ($n^{(2)}_{DMRS}(0)$, $n_{occ}$) to indicate both the cyclic shift and the orthogonal cover code for the demodulation reference signal which are sent to the target user equipment from the base station, wherein $n^{(2)}_{DMRS}(0)$ represents that the base station uses the downlink control information to indicate a cyclic shift for a demodulation reference signal of data in a spatially-multiplexed $0^{th}$ layer of the target user equipment, or indicate a reference value or an initial value or a basic value of a cyclic shift for a demodulation reference signal of data in each spatially-multiplexed layer, or indicate a cyclic shift for a demodulation reference signal of a user in a single antenna port transmission mode;

$n_{occ}$ represents an orthogonal cover code index for the demodulation reference signal of data in the spatially-multiplexed $0^{th}$ layer of the target user equipment, or represents an orthogonal cover code index for the demodulation reference signal of the user in the single antenna port transmission mode.

The indication information combining the cyclic shift and the orthogonal cover code for the demodulation reference signal, which is 3-bit in size, may be used for indicating 8 orthogonal resources $n^{(2)}_{DMRS}(0)$, $n_{occ}$) comprising:

(0, 0), (3, 0), (6, 0), (9, 0), (0, 1), (3, 1), (6, 1) and (9, 1); or (0, 0), (3, 0), (6, 0), (9, 0), (2, 1), (4, 1), (8, 1) and (10, 1); or (2, 0), (4, 0), (8, 0), (10, 0), (0, 1), (3, 1), (6, 1) and (9, 1); or (2, 0), (4, 0), (8, 0), (10, 0), (2, 1), (4, 1), (8, 1) and (10, 1).

The indication information combining the cyclic shift and the orthogonal cover code for the demodulation reference signal, which is 4-bit in size, may be used for indicating 16 orthogonal resources $n^{(2)}_{DMRS}(0)$, $n_{occ}$) comprising: (0, 0), (2, 0), (3, 0), (4, 0), (6, 0), (8, 0), (9, 0), (10, 0), (0, 1), (2, 1), (3, 1), (4, 1), (6, 1), (8, 1), (9, 1) and (10, 1).

The downlink control information may comprise demodulation reference signal information and/or the orthogonal cover code information for the demodulation reference signal.

For a single antenna port transmission mode, the cyclic shift for the demodulation reference signal may be a cyclic shift for the demodulation reference signal on the physical uplink shared channel in the single antenna port transmission; for a multi-antenna port transmission mode, the cyclic shift for the demodulation reference signal may be a cyclic shift for the demodulation reference signal of data in the spatially-multiplexed $0^{th}$ layer, or may be a reference value or an initial value or a basic value of a cyclic shift for the demodulation reference signal of data in each spatially-multiplexed layer.

The cyclic shift for the demodulation reference signal may be 1 bit, 2 bits or 3 bits in size.

The cyclic shift for the demodulation reference signal may comprise: 0, 6; or 0, 3, 6, 9; or 0, 2, 3, 4, 6, 8, 9, 10.

The orthogonal cover code information for the demodulation reference signal may be a 1-bit orthogonal cover code enabling or configuration information.

The method may further comprise: when frequency hopping is not enabled or a channel status indication request is not enabled or layer shifting is enabled, replacing the 1-bit orthogonal cover code enabling or configuration information with a frequency hopping flag or a channel status indication request flag or a transport block to codeword swap flag in the downlink control information.

For a transmission mode with a single antenna port or a single transport block, the 1-bit orthogonal cover code enabling or configuration information may be replaced with the transport block to codeword swap flag or a layer shifting enabling flag in the downlink control information;

for a transmission mode with multiple antenna ports or double transport blocks, the 1-bit orthogonal cover code enabling or configuration information may be defaulted to be not enabled or not configured.

The downlink control information may comprise: the cyclic shift for the demodulation reference signal;

the method may further comprise: indicating, by a network side, the orthogonal cover code information to the user equipment through a high-level signaling.

For a single antenna port transmission mode, the cyclic shift for the demodulation reference signal may be a cyclic shift for the demodulation reference signal on the physical uplink shared channel in the single antenna port transmission;

for a multi-antenna port transmission mode, the cyclic shift for the demodulation reference signal may be a cyclic shift for the demodulation reference signal of data in the spatially-multiplexed $0^{th}$ layer, or is a reference value or an initial value or a basic value of a cyclic shift for the demodulation reference signal of data in each spatially-multiplexed layer.

In the step of indicating, the orthogonal cover code information may be orthogonal cover code enabling or configuration information, and the orthogonal cover code enabling or configuration may be indicated to the user equipment through a Radio Resource Control (RRC) signaling.

The downlink control information may comprise the cyclic shift for the demodulation reference signal and precoding information for the demodulation reference signal;

if the orthogonal cover code is only used for the demodulation reference signal in the single antenna port transmission mode, then in the precoding information, two specific precoding information values may be used to indicate the single antenna port transmission mode and the orthogonal cover code for the demodulation reference signal;

other precoding information values, except the two specific precoding information values and a retention value, may be used to indicate the multi-antenna port transmission mode, and the orthogonal cover code may be not used for the demodulation reference signal.

The disclosure further provides a system for signaling configuration of a physical uplink shared channel, which comprises a base station and a target user equipment, wherein the base station is configured to send downlink control information to the target user equipment through a physical downlink control channel;

the target user equipment is configured to receive the downlink control information on the physical downlink control channel and obtain orthogonal cover code information and/or cyclic shift information;

wherein the downlink control information comprises the orthogonal cover code information and/or the cyclic shift information for scheduling the physical uplink shared channel in a multi-antenna port transmission and/or a single antenna port transmission.

The downlink control information may comprise indication information combining a cyclic shift and an orthogonal cover code for a reference signal.

The downlink control information may comprise the cyclic shift information for a demodulation reference signal and the orthogonal cover code information for the demodulation reference signal.

The downlink control information may comprise a cyclic shift for the demodulation reference signal;

the base station may be further configured to indicate the orthogonal cover code information to the user equipment through a high-level signaling.

The downlink control information may comprise: reference signal information and precoding information, wherein the reference signal information may comprise the cyclic shift for the demodulation reference signal;

the base station may be further configured to, if the orthogonal cover code is only used for the demodulation reference signal in a single antenna port transmission mode, then in the precoding information, use two specific precoding information values to indicate the single antenna port transmission mode and the orthogonal cover code for the demodulation reference signal; and use other precoding information values, except the two specific precoding information values and a retention value, to indicate a multi-antenna port transmission mode, wherein the orthogonal cover code is not used for the demodulation reference signal.

The method and system for signaling configuration of the physical uplink shared channel can solve the problem of indication of Orthogonal Cover Code (OCC) is information in the uplink scheduling information of the physical uplink shared channel in the current LTE system, the indication of the Orthogonal Cover Code (OCC) information of the user equipment is realized by including the orthogonal cover code information and/or cyclic shift information in the downlink control information and sending the downlink control information to the user equipment. The disclosure provides many combinations of indication ways and has excellent applicability; the user equipment can obtain the Orthogonal Cover Code (OCC) information to realize services accurately according to the control information, and the reliability of services can be improved.

BRIEF DESCRIPTION OF THE DRAWINGS

The drawings are provided for further understanding of the disclosure and form a part of the description, they are used for explaining the disclosure together with the embodiments of the disclosure and are not intended to limit the disclosure. In the drawings.

DETAILED DESCRIPTION

To make the purpose, technical solution and advantages of the disclosure more clear, the disclosure will be further described in details below in conjunction with the drawings.

In allusion to the problem in the prior art that there is still no signaling indication information of an Orthogonal Cover Code (OCC) in control information of a physical uplink shared channel, the disclosure proposes a method and system for signaling configuration of a physical uplink shared channel, to realize signaling indication of the Cyclic Shift (CS) and Orthogonal Cover Code (OCC) of the Physical Uplink Shared Channel (PUSCH). In the technical solution of the disclosure, Downlink Control Information (DCI) is defined and used for bearing one or more kinds of information indicating the orthogonal cover code information and/or cyclic shift information. The downlink control information is used for scheduling the physical uplink shared channel in a single antenna port transmission and a multi-antenna port transmission, or only used for scheduling the physical uplink shared channel in the multi-antenna port transmission. The downlink control information is sent to a target user equipment from a base station through a physical downlink control channel.

The method for signaling configuration of a physical uplink shared channel comprises:

a base station sends downlink control information to a target user equipment through a physical downlink control channel, the downlink control information includes orthogonal cover code information and/or cyclic shift information for scheduling the physical uplink shared channel in the multi-antenna port transmission and/or single antenna port transmission.

The following three bearing modes can be employed in the downlink control information:

Mode 1: in the downlink control information, the borne uplink scheduling information includes but not limited to: indication information combining the cyclic shift and the orthogonal cover code for the demodulation reference signal.

The indication information combining the cyclic shift and the orthogonal cover code for the demodulation reference signal is 3 bits or 4 bits in size.

A combination of Orthogonal resources $n^{(2)}_{DMRS}(0), n_{occ})$ can be used to represent both the cyclic shift and the orthogonal cover code sent to the target user equipment by the base station. Wherein $n^{(2)}_{DMRS}(0)$ represents that the base station uses the downlink control information to indicate the cyclic shift for the demodulation reference signal of data in the spatially-multiplexed $0^{th}$ layer of the target user equipment, or indicate the reference value (or called initial value or basic value) of the cyclic shift for the demodulation reference signal of data in each spatially-multiplexed layer, or indicate the cyclic shift for the demodulation reference signal of the user in the single antenna port transmission mode;

the value of $n^{(2)}_{DMRS}(0)$ can be any one of 0, 2, 3, 4, 6, 8, 9, 10;

$n_{occ}$ represents the orthogonal cover code index for the demodulation reference signal of data in the spatially-multiplexed $0^{th}$ layer of the target user equipment, or represents the orthogonal cover code index for the demodulation reference signal of the user in the single antenna port transmission mode;

$n_{occ}=0$ means that the orthogonal cover code [+1, +1] is used, and $n_{occ}=1$ means that the orthogonal cover code [+1, −1] is used.

Mode 2: in the downlink control information, the borne uplink scheduling information includes but not limited to: the cyclic shift information for the demodulation reference signal and the orthogonal cover code information for the demodulation reference signal.

The cyclic shift for the Demodulation Reference Signal (DM RS) is 3 bit in size;

(1) for the single antenna port transmission mode, the cyclic shift for the demodulation reference signal is the cyclic shift for the demodulation reference signal on the physical uplink shared channel in the single antenna port transmission;

(2) for the multi-antenna port transmission mode, the cyclic shift $n^{(2)}_{DMRS}(0)$ for the demodulation reference signal is the cyclic shift for the demodulation reference signal of data in the spatially-multiplexed $0^{th}$ layer, or is the reference value (or called initial value or basic value) of the cyclic shift for the demodulation reference signal of data in each spatially-multiplexed layer.

The orthogonal cover code information for the demodulation reference signal is 1-bit orthogonal cover code enabling or configuration information. When the frequency hopping is not enabled or the channel status indication request is not enabled or the layer shifting is enabled, the 1-bit orthogonal cover code enabling or configuration information is replaced with the frequency hopping flag or the channel status indication request flag or the transport block to codeword swap flag in the downlink control information.

For the transmission mode with the single antenna port or single transport block, the 1-bit orthogonal cover code enabling or configuration information is replaced with the transport block to codeword swap flag or the layer shifting enabling flag in the downlink control information;

for the transmission mode with multiple antenna ports or double transport blocks, the 1-bit orthogonal cover code enabling or configuration information is defaulted to be not enabled or not configured.

In the scenario in which the orthogonal cover code is enabled or configured, there are 16 statuses of the cyclic shift and orthogonal cover code of the user.

Mode 3: in the downlink control information, the borne uplink scheduling information includes but not limited to: the cyclic shift information for the demodulation reference signal;

the orthogonal cover code information is indicated to the user equipment by a network side through a high-level signaling.

The cyclic shift for the Demodulation Reference Signal (DM RS) is 3 bits in size;

(1) for the single antenna port transmission mode, the cyclic shift for the demodulation reference signal is the cyclic shift for the demodulation reference signal on the physical uplink shared channel in the single antenna port transmission;

(2) for the multi-antenna port transmission mode, the cyclic shift $n^{(2)}_{DMRS}(0)$ for the demodulation reference signal is the cyclic shift for the demodulation reference signal of is data in the spatially-multiplexed $0^{th}$ layer, or is the reference value (or called initial value or basic value) of the cyclic shift for the demodulation reference signal of data in each spatially-multiplexed layer.

Under this mode, the orthogonal cover code information is not borne by the downlink control information. The orthogonal cover code information is orthogonal cover code enabling or configuration information, the enabling or configuration of the orthogonal cover code is indicated by a high-level signaling, such as a Radio Resource Control (RRC) signaling.

Figure 5:
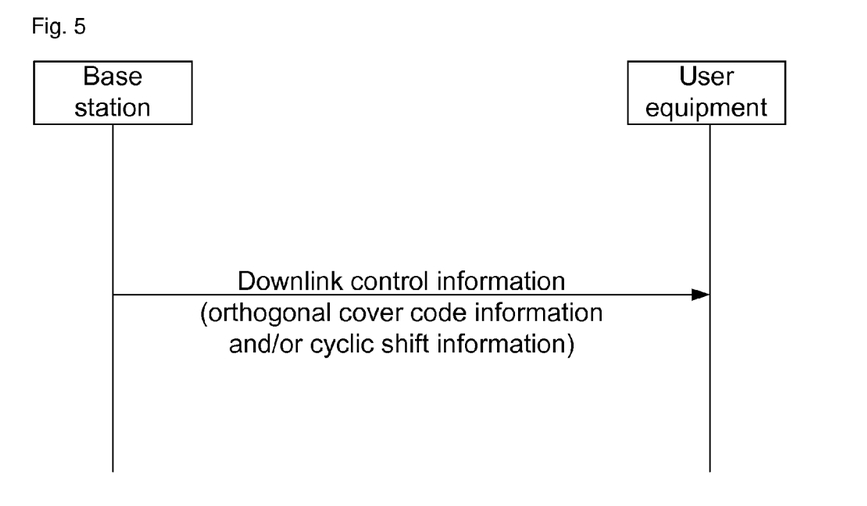
FIG. 5 shows a schematic diagram illustrating a system for signaling configuration of a physical uplink shared channel.

FIG. 5 shows a system for signaling configuration of a physical uplink shared channel, as shown in FIG. 5, the system comprises a base station and a target user equipment, wherein the base station is configured to send downlink control information to the target user equipment through a physical downlink control channel;

the target user equipment is configured to receive the downlink control information from the physical downlink control channel and obtain orthogonal cover code information and/or cyclic shift information;

wherein the downlink control information includes the orthogonal cover code information and/or the cyclic shift information for scheduling the physical uplink shared channel in the multi-antenna port transmission and/or single antenna port transmission.

The downlink control information includes but not limited to: indication information combining cyclic shift and orthogonal cover code for a reference signal.

The downlink control information includes but not limited to: the cyclic shift information for a demodulation reference signal and the orthogonal cover code information for the demodulation reference signal.

The downlink control information includes but not limited to: the cyclic shift for the demodulation reference signal;

the base station is also configured to indicate the orthogonal cover code information to the user equipment through a high-level signaling.

The downlink control information includes but not limited to: reference signal information and precoding information, wherein the reference signal information includes the cyclic shift for the demodulation reference signal;

if the orthogonal cover code is only used for the demodulation reference signal in the single antenna port transmission mode, then in the precoding information, two specific precoding information values are used, by the base station, to indicate the single antenna port transmission mode and the orthogonal cover code for the demodulation reference signal; other precoding information values, except the two specific precoding information values and the retention value, are used to indicate the multi-antenna port transmission mode, and the orthogonal cover code is not used for the demodulation reference signal.

Embodiment 1

In the LTE-A system, the base station schedules the physical uplink shared channel in the single antenna port transmission or multi-antenna port transmission through the downlink control information. The downlink control information is sent to the target user equipment from the base station through the physical downlink control channel.

The uplink scheduling information borne in the downlink control information includes but not limited to:

indication information combining the cyclic shift and orthogonal cover code for the demodulation reference signal, which is 3 bits or 4 bits in size.

A combination of orthogonal resources $n^{(2)}_{DMRS}(0)$, $n_{occ}$) can be used to represent both the cyclic shift and orthogonal cover code sent to the target user equipment by the base station. Wherein $n^{(2)}_{DMRS}(0)$ represents that the base station uses a DCI signaling to indicate the cyclic shift for the demodulation reference signal of data in the spatially-multiplexed $0^{th}$ layer of the target user equipment, or indicate the reference value (or called initial value or basic value) of the cyclic shift for the demodulation reference signal of data in each spatially-multiplexed layer, or indicate the cyclic shift for the demodulation reference signal for the user in the single antenna port transmission mode;

the value of $n^{(2)}_{DMRS}(0)$ can be any one of 0, 2, 3, 4, 6, 8, 9, 10;

$n_{occ}$ represents the orthogonal cover code index for the demodulation reference signal of data in the spatially-multiplexed $0^{th}$ layer of the target user equipment, or represents the orthogonal cover code index for the demodulation reference signal for the user in the single antenna port transmission mode;

$n_{occ}=0$ means that the orthogonal cover code [+1, +1] is used, and $n_{occ}=1$ means that the orthogonal cover code [+1, −1] is used.

Further, the first kind of 8 preferred combinations $n^{(2)}_{DMRS}(0)$, $n_{occ}$) represented by the 3-bit DCI information are: (0, 0), (3, 0), (6, 0), (9, 0), (0, 1), (3, 1), (6, 1) and (9, 1), as specifically shown in Table 2:

TABLE 2

The First Kind of Preferred Combinations of Cyclic Shifts and Orthogonal Cover Codes

| $n^{(2)}_{DMRS}(0)$ | Orthogonal cover code index $n_{occ}$ | |
|---|---|---|
| | 0 | 1 |
| 0 | [+1, +1] | [+1, −1] |
| 2 | | |
| 3 | [+1, +1] | [+1, −1] |
| 4 | | |
| 6 | [+1, +1] | [+1, −1] |
| 8 | | |
| 9 | [+1, +1] | [+1, −1] |
| 10 | | |

Further, the second kind of 8 preferred combinations $(n^{(2)}_{DMRS}(0)$, $n_{occ})$ represented by the 3-bit DCI information are: (0, 0), (3, 0), (6, 0), (9, 0), (2, 1), (4, 1), (8, 1) and (10, 1), as specifically shown in Table 3:

TABLE 3

The Second Kind of Preferred Combinations of Cyclic Shifts and Orthogonal Cover Codes

| $n^{(2)}_{DMRS}(0)$ | Orthogonal cover code index $n_{occ}$ | |
|---|---|---|
| | 0 | 1 |
| 0 | [+1, +1] | |
| 2 | | [+1, −1] |
| 3 | [+1, +1] | |
| 4 | | [+1, −1] |
| 6 | [+1, +1] | |
| 8 | | [+1, −1] |
| 9 | [+1, +1] | |
| 10 | | [+1, −1] |

Further, the third kind of 8 preferred combinations $n^{(2)}_{DMRS}(0)$, $n_{occ}$) represented by the 3-bit DCI information are: (2, 0), (4, 0), (8, 0), (10, 0), (0, 1), (3, 1), (6, 1) and (9, 1), as specifically shown in Table 4:

TABLE 4

The Third Kind of Preferred Combinations of Cyclic Shifts and Orthogonal Cover Codes

| $n^{(2)}_{DMRS}(0)$ | Orthogonal cover code index $n_{occ}$ | |
|---|---|---|
| | 0 | 1 |
| 0 | | [+1, −1] |
| 2 | [+1, +1] | |
| 3 | | [+1, −1] |
| 4 | [+1, +1] | |
| 6 | | [+1, −1] |
| 8 | [+1, +1] | |

TABLE 4-continued

The Third Kind of Preferred Combinations of Cyclic
Shifts and Orthogonal Cover Codes

| | Orthogonal cover code index $n_{occ}$ | |
|---|---|---|
| $n^{(2)}_{DMRS}(0)$ | 0 | 1 |
| 9 | | [+1, −1] |
| 10 | [+1, +1] | |

Further, the fourth kind of 8 preferred combinations $n^{(2)}_{DMRS}(0)$, $n_{occ}$) represented by the 3-bit DCI information are: (2, 0), (4, 0), (8, 0), (10, 0), (2, 1), (4, 1), (8, 1) and (10, 1), as specifically shown in Table 5:

TABLE 5

The Fourth Kind of Preferred Combinations of Cyclic Shifts and
Orthogonal Cover Codes

| | Orthogonal cover code index $n_{occ}$ | |
|---|---|---|
| $n^{(2)}_{DMRS}(0)$ | 0 | 1 |
| 0 | | |
| 2 | [+1, +1] | [+1, −1] |
| 3 | | |
| 4 | [+1, +1] | [+1, −1] |
| 6 | | |
| 8 | [+1, +1] | [+1, −1] |
| 9 | | |
| 10 | [+1, +1] | [+1, −1] |

Further, the fifth kind of 16 preferred combinations $n^{(2)}_{DMRS}(0)$, $n_{occ}$) represented by the 4-bit DCI information are: (0, 0), (2, 0), (3, 0), (4, 0), (6, 0), (8, 0), (9, 0), (10, 0), (0, 1), (2, 1), (3, 1), (4, 1), (6, 1), (8, 1), (9, 1) and (10, 1).

Embodiment 2

In the LTE-A system, the base station schedules the physical uplink shared channel in the single antenna port transmission or multi-antenna port transmission through the downlink control information. The downlink control information is sent to the target user equipment from the base station through a physical downlink control channel.

The uplink scheduling information borne in the downlink control information includes but not limited to: the cyclic shift information for the demodulation reference signal and the orthogonal cover code information for the demodulation reference signal;

wherein the cyclic shift for the Demodulation Reference Signal (DM RS) is 3 bits in size;

(1) for the single antenna port transmission mode, the cyclic shift for the demodulation reference signal is the cyclic shift for the demodulation reference signal on the physical uplink shared channel in single antenna port transmission;

(2) for the multi-antenna port transmission mode, the cyclic shift $n^{(2)}_{DMRS}(0)$ for the demodulation reference signal is the cyclic shift for the demodulation reference signal of data in the spatially-multiplexed $0^{th}$ layer, or is the reference value (or called initial value or basic value) of the cyclic shift for the demodulation reference signal of data in each spatially-multiplexed layer.

The orthogonal cover code information for the demodulation reference signal is 1-bit orthogonal cover code enabling or configuration information. When the frequency hopping is not enabled or the channel status indication request is not enabled or the layer shifting is enabled, the 1-bit orthogonal cover code enabling or configuration information is replaced with the frequency hopping flag or the channel status indication request flag or the transport block to codeword swap flag in the downlink control information.

For the transmission mode with the single antenna port or single transport block, the 1-bit orthogonal cover code enabling or configuration information is replaced with the transport block to codeword swap flag or the layer shifting enabling flag in the downlink control information;

for the transmission mode with multiple antenna ports or double transport blocks, the 1-bit orthogonal cover code enabling or configuration information is defaulted to be not enabled or not configured.

In the scenario in which the orthogonal cover code is enabled or configured, there are 16 statuses of the cyclic shift and orthogonal cover code of the user, as shown in Table 6.

TABLE 6

The Fifth Kind of Preferred Combinations of Cyclic
Shifts and Orthogonal Cover Codes

| | Orthogonal cover code index $n_{occ}$ | |
|---|---|---|
| $n^{(2)}_{DMRS}(0)$ | 0 | 1 |
| 0 | [+1, +1] | [+1, −1] |
| 2 | [+1, +1] | [+1, −1] |
| 3 | [+1, +1] | [+1, −1] |
| 4 | [+1, +1] | [+1, −1] |
| 6 | [+1, +1] | [+1, −1] |
| 8 | [+1, +1] | [+1, −1] |
| 9 | [+1, +1] | [+1, −1] |
| 10 | [+1, +1] | [+1, −1] |

Embodiment 3

In the LTE-A system, the base station schedules the physical uplink shared channel in the single antenna port transmission or multi-antenna port transmission through the downlink control information. The downlink control information is sent to the target user equipment from the base station through a physical downlink control channel.

The uplink scheduling information borne in the downlink control information includes but not limited to: the cyclic shift for the Demodulation Reference Signal (DM RS), which is 3 bits in size.

(1) For the single antenna port transmission mode, the cyclic shift for the demodulation reference signal is the cyclic shift for the demodulation reference signal on the physical uplink shared channel in the single antenna port transmission;

(2) for the multi-antenna port transmission mode, the cyclic shift $n^{(2)}_{DMRS}(0)$ for the demodulation reference signal is the cyclic shift for the demodulation reference signal of data in the spatially-multiplexed $0^{th}$ layer, or is the reference value (or called initial value or basic value) of the cyclic shift for the demodulation reference signal of data in each spatially-multiplexed layer.

For orthogonal cover code information, the orthogonal cover code enabling or configuration is indicated by a high-level signaling, such as a Radio Resource Control (RRC) signaling.

Embodiment 4

In the LTE-A system, the base station schedules the physical uplink shared channel in the single antenna port transmission or multi-antenna port transmission through the downlink control information. The downlink control information is sent to the target user equipment from the base station through a physical downlink control channel.

The uplink scheduling information borne in the downlink control information includes but not limited to: demodulation reference signal information and precoding information.

The demodulation reference signal information includes the cyclic shift for the Demodulation Reference Signal (DM RS), which is 3 bits in size.

(1) For the single antenna port transmission mode, the cyclic shift for the demodulation reference signal is the cyclic shift for the demodulation reference signal on the physical uplink shared channel in the single antenna port transmission;

(2) for the multi-antenna port transmission mode, the cyclic shift $n^{(2)}_{DMRS}(0)$ for the demodulation reference signal is the cyclic shift for the demodulation reference signal of data in the spatially-multiplexed $0^{th}$ layer, or is the reference value (or called initial value or basic value) of the cyclic shift for the demodulation reference signal of data in each spatially-multiplexed layer.

The precoding information includes: PMI information, which is 3 bits or 6 bits in size.

if the orthogonal cover code is only used for the demodulation reference signal in the single antenna port transmission mode, then in the precoding information:

a specific precoding information value is used to indicate the single antenna port transmission mode, and the orthogonal cover code for the demodulation reference signal is [+1, +1];

another specific precoding information value is used to indicate the single antenna port transmission mode, and the orthogonal cover code for the demodulation reference signal is [+1, −1];

other precoding information values, except the above two specific precoding information values and the retention value, are used to indicate the multi-antenna port transmission mode, and the orthogonal cover code is not used for the demodulation reference signal.

The above mentioned are only preferred embodiments of the disclosure and are not intended to limit the disclosure. For those skilled in the art, the disclosure may have various kinds of modifications and changes. Any modifications, equivalent replacements and improvements within the spirit and principle of the disclosure shall be included within the protection scope of the disclosure.

INDUSTRIAL APPLICABILITY

The method and system for signaling configuration of a physical uplink shared channel solve the problem of indication of OCC information in the uplink scheduling information of the physical uplink shared channel in the current LTE system, the indication of the Orthogonal Cover Code (OCC) information of the user equipment is realized by carrying the orthogonal cover code information and/or cyclic shift information in the downlink control information and sending the downlink control information to the user equipment. The disclosure provides multiple combinations of indication ways and has excellent applicability; the user equipment can obtain the OCC information to realize services accurately according to the control information, and the reliability of services can be improved.

What is claimed is:

1. A method for signaling configuration of a physical uplink shared channel, comprising:
   sending, by a base station, downlink control information to a target user equipment through a physical downlink control channel, wherein the downlink control information comprises indication information combining a cyclic shift and an orthogonal cover code for the demodulation reference signal, and is used for scheduling the physical uplink shared channel in a multi-antenna port transmission and/or a single antenna port transmission;
   wherein the indication information combining the cyclic shift and the orthogonal cover code for the demodulation reference signal is 3-bit or 4-bit in size, and used for using a combination of orthogonal resources ($n^{(2)}_{DMRS}(0)$, $n_{occ}$) to indicate both the cyclic shift and the orthogonal cover code for the demodulation reference signal which are sent to the target user equipment from the base station, wherein
   $n^{(2)}_{DMRS}(0)$ represents that the base station uses the downlink control information to indicate a cyclic shift for a demodulation reference signal of data in a spatially-multiplexed $0^{th}$ layer of the target user equipment, or indicate a reference value or an initial value or a basic value of a cyclic shift for a demodulation reference signal of data in each spatially-multiplexed layer, or indicate a cyclic shift for a demodulation reference signal of a user in a single antenna port transmission mode;
   $n_{occ}$ represents an orthogonal cover code index for the demodulation reference signal of data in the spatially-multiplexed $0^{th}$ layer of the target user equipment, or represents an orthogonal cover code index for the demodulation reference signal of the user in the single antenna port transmission mode.

2. The method according to claim 1, wherein the indication information combining the cyclic shift and the orthogonal cover code for the demodulation reference signal, which is 3-bit in size, is used for indicating 8 orthogonal resources ($n^{(2)}_{DMRS}(0)$, $n_{occ}$) comprising:
   (0, 0), (3, 0), (6, 0), (9, 0), (0, 1), (3, 1), (6, 1) and (9, 1);
   or (0, 0), (3, 0), (6, 0), (9, 0), (2, 1), (4, 1), (8, 1) and (10, 1);
   or (2, 0), (4, 0), (8, 0), (10, 0), (0, 1), (3, 1), (6, 1) and (9, 1);
   or (2, 0), (4, 0), (8, 0), (10, 0), (2, 1), (4, 1), (8, 1) and (10, 1).

3. The method according to claim 1, wherein the indication information combining the cyclic shift and the orthogonal cover code for the demodulation reference signal, which is 4-bit in size, is used for indicating 16 orthogonal resources ($n^{(2)}_{DMRS}(0)$, $n_{occ}$) comprising:
   (0, 0), (2, 0), (3, 0), (4, 0), (6, 0), (8, 0), (9, 0), (10, 0), (0, 1), (2, 1), (3, 1), (4, 1), (6, 1), (8, 1), (9, 1) and (10, 1).

4. A method for signaling configuration of a physical uplink shared channel, comprising:
   sending, by a base station, downlink control information to a target user equipment through a physical downlink control channel, wherein the downlink control information comprises: the cyclic shift for the demodulation reference signal, and is used for scheduling the physical uplink shared channel in a multi-antenna port transmission and/or a single antenna port transmission;
   the method further comprises: indicating, by a network side, the orthogonal cover code information to the user equipment through a high-level signaling;
   wherein for a single antenna port transmission mode, the cyclic shift for the demodulation reference signal is a cyclic shift for the demodulation reference signal on the physical uplink shared channel in the single antenna port transmission;

for a multi-antenna port transmission mode, the cyclic shift for the demodulation reference signal is a cyclic shift for the demodulation reference signal of data in the spatially-multiplexed $0^{th}$ layer, or is a reference value or an initial value or a basic value of a cyclic shift for the demodulation reference signal of data in each spatially-multiplexed layer.

5. The method according to claim 4, wherein in the step of indicating, the orthogonal cover code information is orthogonal cover code enabling or configuration information, and the orthogonal cover code enabling or configuration is indicated to the user equipment through a Radio Resource Control (RRC) signaling.

6. A system for signaling configuration of a physical uplink shared channel, comprising a base station and a target user equipment, wherein the base station is configured to send downlink control information to the target user equipment through a physical downlink control channel;

the target user equipment is configured to receive the downlink control information on the physical downlink control channel and obtain orthogonal cover code information and/or cyclic shift information;

wherein the downlink control information comprises indication information combining a cyclic shift and an orthogonal cover code for a reference signal for scheduling the physical uplink shared channel in a multi-antenna port transmission and/or a single antenna port transmission;

wherein the indication information combining the cyclic shift and the orthogonal cover code for the demodulation reference signal is 3-bit or 4-bit in size, and used for using a combination of orthogonal resources ($n^{(2)}_{DMRS}(0)$, $n_{occ}$) to indicate both the cyclic shift and the orthogonal cover code for the demodulation reference signal which are sent to the target user equipment from the base station, wherein $n^{(2)}_{DMRS}(0)$ represents that the base station uses the downlink control information to indicate a cyclic shift for a demodulation reference signal of data in a spatially-multiplexed $0^{th}$ layer of the target user equipment, or indicate a reference value or an initial value or a basic value of a cyclic shift for a demodulation reference signal of data in each spatially-multiplexed layer, or indicate a cyclic shift for a demodulation reference signal of a user in a single antenna port transmission mode;

$n_{occ}$ represents an orthogonal cover code index for the demodulation reference signal of data in the spatially-multiplexed $0^{th}$ layer of the target user equipment, or represents an orthogonal cover code index for the demodulation reference signal of the user in the single antenna port transmission mode.

* * * * *